(12) United States Patent
Nakamura et al.

(10) Patent No.: US 8,631,735 B2
(45) Date of Patent: Jan. 21, 2014

(54) PNEUMATIC BOOSTER

(75) Inventors: Tadaaki Nakamura, Minami-ALPS (JP); Mitsuhiro Endou, Ebina (JP); Keiichi Saiwaki, Minami-ALPS (JP)

(73) Assignee: Hitachi Automotive Systems, Ltd., Kanagawa (JP)

( * ) Notice: Subject to any disclaimer, the term of this patent is extended or adjusted under 35 U.S.C. 154(b) by 1092 days.

(21) Appl. No.: 12/591,626

(22) Filed: Nov. 25, 2009

(65) Prior Publication Data

US 2010/0132543 A1    Jun. 3, 2010

(30) Foreign Application Priority Data

Nov. 28, 2008  (JP) ................................. 2008-304051

(51) Int. Cl.
  *B60T 13/567*  (2006.01)
  *F15B 9/10*    (2006.01)

(52) U.S. Cl.
  USPC ........................................ 91/376 R; 92/98 R (58) Field of Classification Search
  USPC ........................................ 91/376 R; 92/98 R
  See application file for complete search history.

(56) References Cited

U.S. PATENT DOCUMENTS

| 4,538,503 | A | * | 9/1985 | Hachiro | 91/376 R |
| 4,586,580 | A | * | 5/1986 | Spielmann et al. | 180/89.1 |
| 5,765,468 | A | * | 6/1998 | Gautier et al. | 91/376 R |
| 6,848,352 | B2 | * | 2/2005 | Lorkin | 91/376 R |
| 2007/0283690 | A1 | * | 12/2007 | Miller et al. | 60/547.1 |

FOREIGN PATENT DOCUMENTS

JP    2000-219126 A    8/2000

* cited by examiner

*Primary Examiner* — F. Daniel Lopez
(74) *Attorney, Agent, or Firm* — Rader, Fishman & Grauer PLLC (57) ABSTRACT

There is provided a pneumatic booster, comprising: a front shell; a rear shell; a housing formed as that respective openings of the front shell and the rear shell are integrally connected to each other, and a power piston arranged in the housing so as to divide an interior of the housing into a constant-pressure chamber on the front shell side and a working-pressure chamber on the rear shell side, wherein thrust force of the power piston generated by pressure difference between the constant-pressure chamber and the working-pressure chamber is applied to inputted force transmitted from a brake pedal to an input rod so as to obtain combined force, the combined force being outputted with a given boost ratio from an output rod, and wherein a thickness of the front shell is made to be thinner than a thickness of the rear shell.

17 Claims, 6 Drawing Sheets

PNEUMATIC BOOSTER

BACKGROUND OF THE INVENTION

1. Field of the Invention

The present invention relates to a pneumatic booster that is applicable to brake equipments of automobiles, etc.

2. Description of the Related Art

In general, brake equipments of automobiles are provided with a pneumatic booster for enhancement of braking force. In the pneumatic booster, its housing is divided into a constant-pressure chamber (normally kept to negative pressures by depression at engine manifold) and a working-pressure chamber by means of a power piston. Further, a plunger that is connected to the power piton and provided within a valve body is adapted to move by means of an input rod connected to a brake pedal so as to introduce air (positive pressure) into the transformer chamber so as to generate pressure differences between the constant-pressure chamber and the working-pressure chamber. Through the pressure differences, thrust force will be generated onto the power piston. Still further, the thrust force of the power piston affects an output rod through action members so as to operate a master cylinder while counterforce acted from the output rod to the reaction members will be partially fed back to the input rod. Accordingly, pedal control force of drivers can be reduced with large braking force. This also enables control of braking force in a good manner.

In the pneumatic booster for automobiles, for weight saving purposes it is demanded for a thickness of the housing to be thin while maintaining necessary hardness and rigidity thereof. Further, in case that excessive external force is applied to the housing from the side of the master cylinder during vehicle collision, it will be necessary for the housing to be easily deformed in order to repress movement of brake pedals. Accordingly, Japanese Patent Application Laid-Open No. 2000-219126 (hereinafter referred to as Patent Document 1) discloses a pneumatic booster as follows.

In the Patent Document 1, a thick stiffener is mounted on the fore-end portion of a housing by means of a rivet that is adapted to fracture with a certain load. Accordingly, this enables the housing to be easily deformed in case that excessive external force is applied to the housing, whereby traveling amount of a brake pedal can be minimized.

However, in the Patent Document 1, it would be necessary to have the stiffener and the particular rivet thereby increasing a number of parts while reducing production efficiencies.

SUMMARY OF THE INVENTION

The present invention has been made in light of the above problem, and it is an object of the present invention to provide a pneumatic booster with a simple structure where a housing thereof can be easily deformed in case that excessive external force is applied to the housing.

In order to achieve the object described above, according to a first aspect of the present invention, there is provided a pneumatic booster, comprising: a front shell; a rear shell; a housing formed as that respective openings of the front shell and the rear shell are integrally connected to each other; and a power piston arranged in the housing so as to divide an interior of the housing into a constant-pressure chamber on the front shell side and a working-pressure chamber on the rear shell side, wherein thrust force of the power piston generated by pressure difference between the constant-pressure chamber and the working-pressure chamber is applied to inputted force transmitted from a brake pedal to an input rod so as to obtain combined force, the combined force being outputted with a given boost ratio from an output rod, and wherein a thickness of the front shell is made to be thinner than a thickness of the rear shell.

Further, according to a second aspect of the present invention, there is provided a pneumatic booster, comprising: a front shell on which a master cylinder is mounted; a rear shell, the rear shell being arranged on the side of a vehicle body; a housing formed as that respective openings of the front shell and the rear shell are integrally connected to each other, a power piston arranged in the housing so as to divide an interior of the housing into a constant-pressure chamber on the front shell side and a working-pressure chamber on the rear shell side; and a tie rod that penetrates the front shell, the rear shell and the power piston, the tie rod being provided with a mounting screw portion to the side of a vehicle body on one side of the tie bar, wherein thrust force of the power piston generated by pressure difference between the constant-pressure chamber and the working-pressure chamber is applied to inputted force transmitted from a brake pedal to an input rod so as to obtain combined force, the combined force being outputted with a given boost ratio from an output rod, and wherein a thickness of the front shell is made to be thinner than a thickness of the rear shell.

Still further, according to a third aspect of the present invention, there is provided a pneumatic booster, comprising: a front shell on which a master cylinder is mounted; a rear shell, the rear shell being arranged on the side of a vehicle body; a housing that is formed as that the front shell and the rear shell are integrally fabricated; a power piston that is arranged in the housing so as to divide an interior of the housing into a constant-pressure chamber on the front shell side and a working-pressure chamber on the rear shell side; a tie rod that penetrates the power piston so as to connect the front shell with the rear shell, the tie rod being provided with a mounting screw portion to the side of a vehicle body on one side of the tie bar and also being provided with a fixed screw portion on the other end side of tie rod for fixation of the master cylinder; a valve body that is movably inserted into the housing so as to connect with the power piston; an input rod that is inserted into the valve body so as to connect with a brake pedal; a plunger that is connected with the input rod, the plunger being movable within the valve body; an output rod that is provided with the valve body so as to operate the master cylinder; a reaction member that is provided between the output rod and the valve body or the plunger, the reaction member partially transmitting reaction force generated from the output rod to the plunger; and a control valve enabling to convert a connection between the working-pressure chamber and atmosphere as well as a connection between the constant-pressure chamber and the working-pressure chamber; wherein a thickness of the front shell is made to be thinner than a thickness of the rear shell, and one end side of the tie rod is fixed to the rear shell through caulking.

DETAILED DESCRIPTION OF THE PREFERRED EMBODIMENTS

Figure 1:
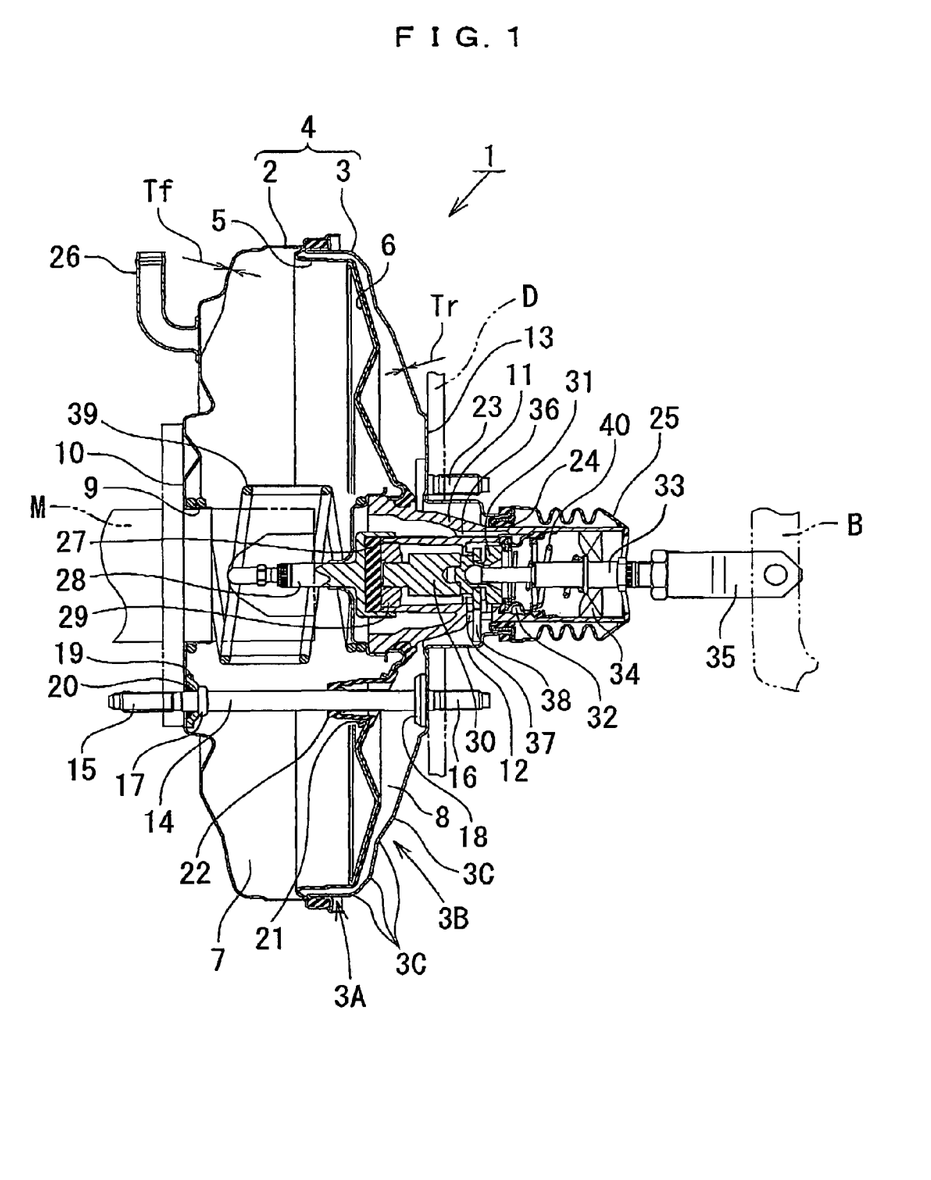
FIG. 1 illustrates a longitudinal section of a pneumatic booster according to one embodiment of the present invention.
Figure 2:
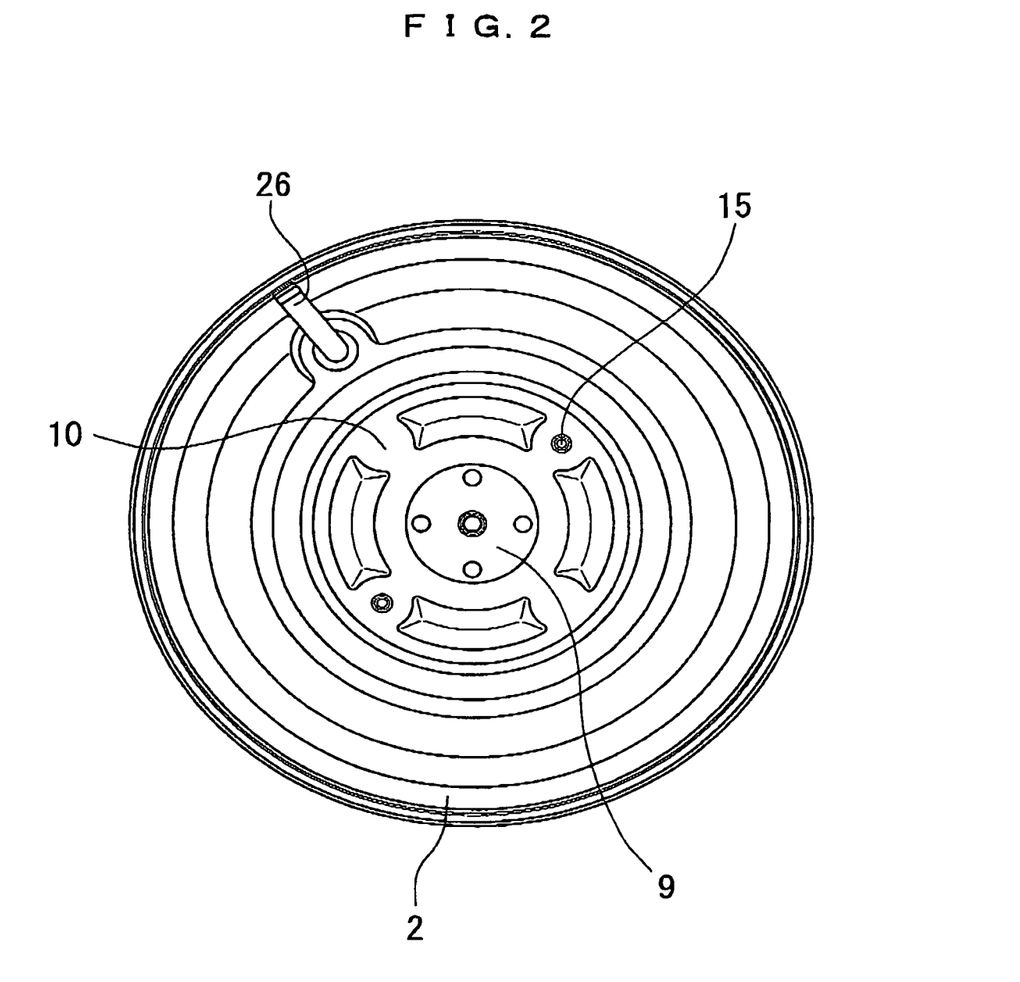
FIG. 2 illustrates an external view of the pneumatic booster seen from a front shell side thereof.
Figure 3:
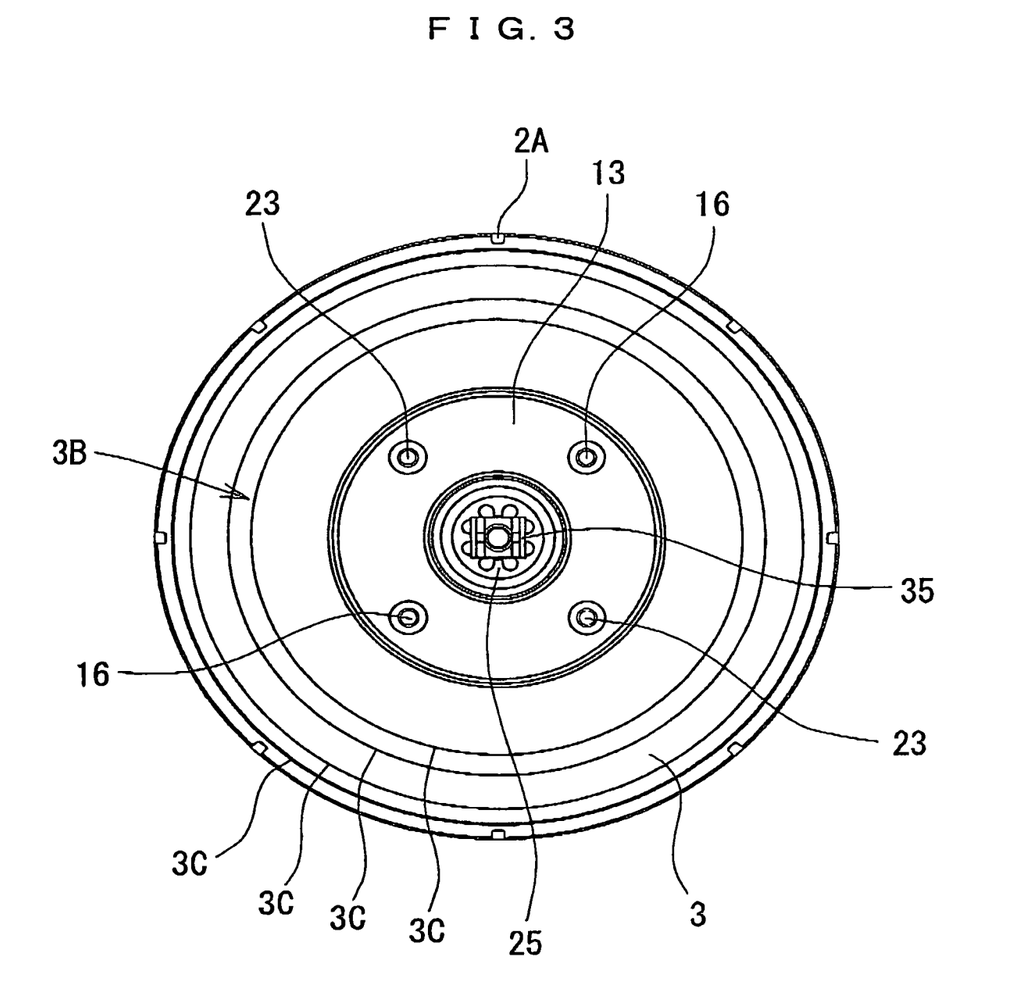
FIG. 3 illustrates an external view of the pneumatic booster seen from a rear shell side thereof.

Preferred embodiments of the present invention will be described with reference to the accompanying drawings. In FIG. 1, a longitudinal section of a pneumatic booster 1 according to an embodiment of the present invention is illustrated. Further, FIG. 2 illustrates an external view of the pneumatic booster 1 seen from a front shell side thereof, and FIG. 3 illustrates an external view of the pneumatic booster 1 seen from a rear shell side thereof. As shown in FIG. 1, the pneumatic booster 1 according to the embodiment of the present invention is categorized into a single-typed pneumatic booster where a housing 4 is formed by connecting a front shell 2 and a rear shell 3 both made of thin steel plates. This housing 4 is divided into two chambers, that is, a constant-pressure chamber 7 and a working-pressure chamber 8, by means of a power piston 6 provided with a diaphragm 5. Each of the front shell 2 and the rear shell 3 is approximately cylindrical with a bottom. Further, the front shell 2 has an opening at the external periphery thereof, while the rear shell 3 has also an opening at the external periphery thereof. An external periphery portion of the diaphragm 5 is sandwiched between those openings of the front shell 2 and the rear shell 3. By caulking a plurality of claw portions 2A provided on the front shell 2, the front shell 2 and the rear shell 3 are airtightly connected.

A bottom portion of the front shell 2 is provided with a central opening 9 into which a back-end portion of a master cylinder M is inserted. The periphery of the central opening 9 is provided with a front bearing surface 10, approximately flat, so as to fix the master cylinder M. At a central bottom portion of the rear shell 3, a cylindrical portion 12 is projected for insertion of a valve body 11, the details of which are hereinafter explained. The periphery of the cylindrical portion 12 is provided with a rear bearing seat 13, approximately flat, that will be a vehicle attached portion when mounted to a vehicle body. In the present invention, a dash panel D will be a mounting portion on a side of the vehicle body. A major-diameter cylindrical portion 3A of the rear shell 3 in which to be connected with the front shell 2 and the rear bearing seat 13 are connected with an inclined portion 3B approximately cylindrical. This inclined portion 3B is provided with a plurality of bent portions 3C in a radial direction of the rear shell 3, each of the plurality of bent portions 3C extending circumferentially as a part of the rear surface of the rear shell 3.

The housing 4 is provided with a tie rod 14, the tie rod 14 penetrating from the front bearing surface 10 of the front shell 2 to the rear bearing surface 13 of the rear shell 3. One end side of the tie rod 14 is provided with a mounting screw portion 15 while the other end side thereof is provided with a fixed screw portion 16. Further, each base portion of the mounting screw portion 15 and the fixed screw portion 16 is provided with a front flange 17 and a rear flange 18, respectively, both the front flange 17 and the rear flange 18 being expanded in their diameters. The front flange 17 is airtightly abutted to the interior of the front bearing surface 10 through a retainer 19 and a seal 20 while the rear flange 18 is airtightly abutted to the interior of the rear bearing surface 13. In this condition, the tie rod 14 is fixed on a side of the rear shell 3 through caulking. A longitudinally intermediate portion of the tie rod 14 is inserted into an opening 21 provided with the power piston 6 and also inserted into a rod seal 22, approximately cylindrical, integrally formed with the diaphragm, whereby the tie rod 14 penetrates the power piston 6 and the diaphragm 5 in slidable and airtight manners.

Figure 4:
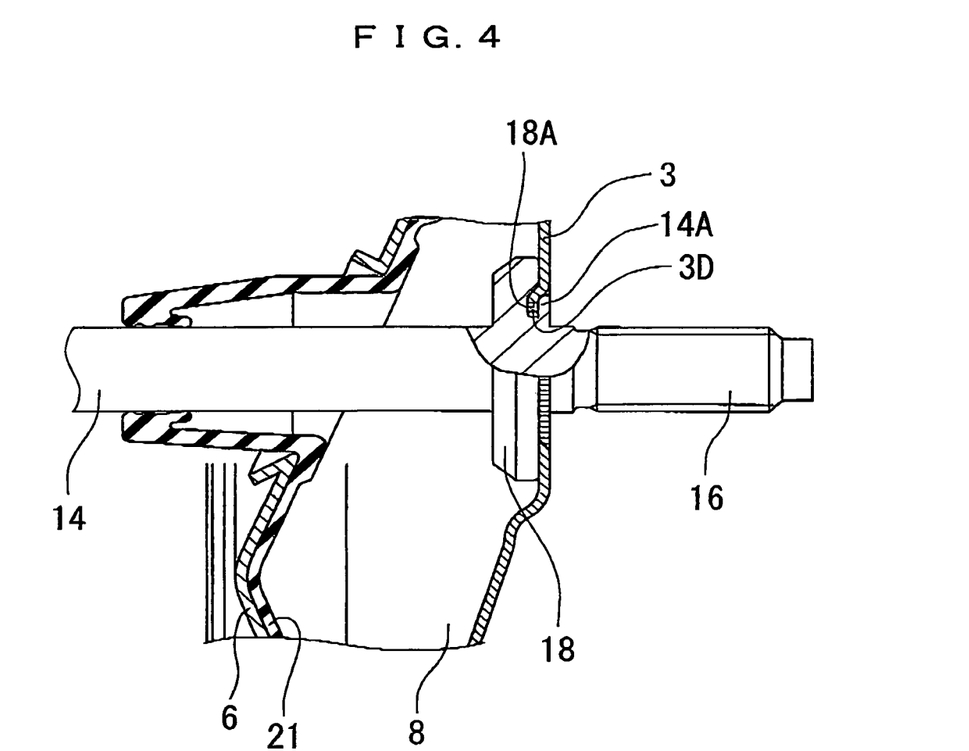
FIG. 4 illustrates an expanded longitudinal section showing that a tie rod in FIG. 1 penetrates the rear shell and a power piston.
Figures 5, 5A:
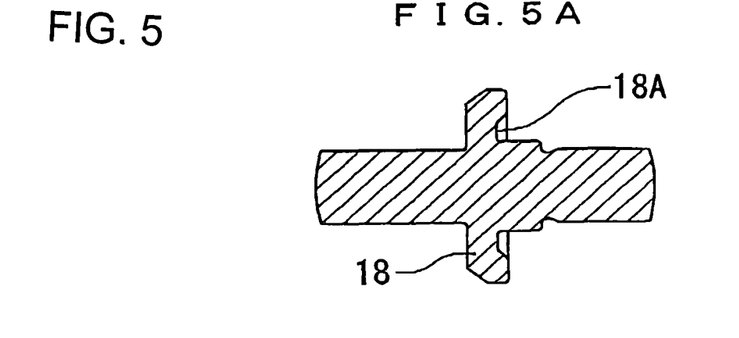
FIG. 5 illustrates a partial cross section showing a process where the tie rod is fixed to the rear shell through caulking.
Figure 5B:
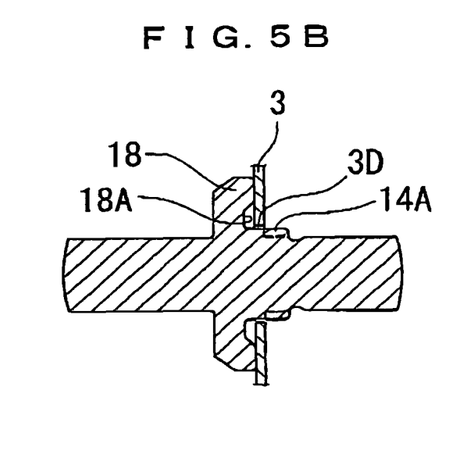
Figure 5C:
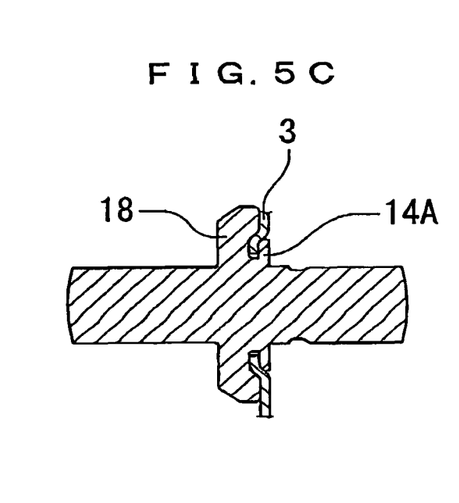

Here, how to fix the tie rod 14 on a side of the rear shell 3 through caulking will be explained with reference to FIGS. 4 and 5. FIG. 4 illustrates an expanded longitudinal section where the tie rod 14 in FIG. 1 penetrates the rear shell 3 and the power piston 6. FIG. 5 illustrates a partial cross section of caulking processes. On the side where the rear flange 18 of the tie rod 14 is abutted to the rear shell 3, as shown in FIG. 5(A), an annular concave portion 18A is formed. After the fixed screw portion 16 of the tie rod 14 is inserted into a hole portion 3D provided with the rear shell 3 (see FIG. 5(B)), the edge of the hole 3D is pressed into the concave portion 18A while removing a caulking thick portion 14A of the tie rod 14 so as to fix the tie rod 14 to the rear shell 3 through caulking (See FIG. 5(C)). Here, since the tie rod 14 is fixed through caulking to the side of the rear shell 3 whose board is relatively thicker than the other portions, it is possible to obtain sufficient strength and rigidity for mounting. Further, a rear bolt 23 to be explained later will be fixed through caulking in the same manner as described above.

The rod seal 22 is provided with a tapered cylindrical portion. A lip-shaped seal portion that is provided on the nose of the cylindrical portion is abutted to the tie rod 14 for sealing. Here, both the base end portion of the rod seal 22 and the opening 21 of the power piston 6 have inner diameters sufficiently larger than the outer diameter of the tie rod 14. Accordingly, even if mounting positions of the tie rod 14 are slightly varied depending on vehicle types, etc., the positional differences of the tie rod 14 can be absorbed by deforming the rod seal 22, whereby it would be not necessary for the power piston 6 and the diaphragm 5 to be modified according to the mounting positions. The tie rod 14 is arranged on the front bearing surface 10 and the rear bearing surface 13 each at two places in a diameter direction (showing only one side), the master cylinder 10 is fixed to the front bearing surface 10 through the mounting screw portion 15, and the rear bearing surface 13 is fixed to the dash panel D through the fixed screw portion 16. Further, the rear bolt 23 is fixed to the rear bearing surface 13 through caulking, the rear bearing surface 13 being thus fixed to the dash panel D.

In the housing 4, a thickness Tf of the front shell 2 is made to be thinner than one of the conventional front shell while a thickness Tr of the rear shell 3 is made to be thicker than one of the conventional rear shell. Conventionally, the thickness of both the front shell and the rear shell is made to be both 0.8 mm. Contrarily, in the present invention, the thickness Tf of the front shell 2 is set to be 0.7 mm while the thickness Tr of the rear shell 3 is set to be 0.9 mm. In this case, ratio between rigidity of the front shell 2 relative to pressure coming from the exterior of the constant-pressure chamber 7 (deformation amount with application of constant load) and rigidity of the rear shell 3 relative, to pressure coming from the exterior of the working-pressure chamber 8 (deformation amount with application of constant load) becomes approximately 1:2. Accordingly, against the excessive external force applying to the housing 4, the front shell 2 can be easily deformed. Moreover, it is preferable that the thickness Tf of the front shell 2 is set as that Tf=0.6 to 0.8 mm while the thickness Tr of the rear shell 3 is set as that Tr=0.7 to 1.0 mm. Here, by setting the difference between the thickness Tf of the front shell 2 and the thickness Tr of the rear shell 3 to 0.1 to 0.3 mm, the weight-saving of the housing 4 can be achieved further effectively since the front shell 2 has a surface area larger than the rear shell 3.

The fore-end portion of the valve body 11, approximately formed into a cylindrical shape, is inserted into the central opening of the power piston 6 and the diaphragm 5, so that an interior margin of the central opening will be fitted to an exterior groove of the valve body 11 so as to be airtightly connected to each other. A back-end side of the valve body 11 is passed through the working-pressure chamber 8 and inserted into the cylindrical portion 12 placed at the rear of the rear shell 3. The back-end side of the valve body 11 then extends outside from the cylindrical portion 12. The cylindrical portion 12 is provided with a seal member 24, whereby the cylindrical portion 12 and the valve body 11 are sealed in a slidable manner. Further, a zigzag-patterned dust cover 25 is provided between the cylindrical portion 12 and the valve body 11. A connecting pipe 26 is mounted on the front shell 2, and the connecting pipe 26 is connected to a negative pressure source (not shown) such as induction pipes, etc. of an engine, so that the constant-pressure chamber 7 is normally kept to a given negative pressure.

A base end portion of the output rod 28 is connected to the fore-end portion of the cylindrical portion of the valve body 11 in the constant-pressure chamber 7 through a reaction member 27, and a tip portion of the output rod 28 is abutted to a piston of the master cylinder M mounted on the front bearing surface 10

Within the cylindrical portion of the valve body 11, a counterforce adjusting member 29 and a reaction rod 30 abutted to the reaction member 27, a plunger 31 abutted to the reaction rod 30, and a control valve 32 controlled by the plunger 31 are inserted. The fore-end portion of an input rod 33 is connected to the plunger 31, the input rod 33 being inserted from the rear of the valve body 11, and the base end portion of the input rod 33 extends outside through an air-permeable dust seal 34 that is mounted on the rear portion of the valve body 11. The base end portion of the input rod 33 is provided with a clods 35 for connection of a brake pedal B.

On a lateral wall of the valve body 11, a constant-pressure passage 36 communicating with the constant-pressure chamber 7 and an atmospheric passage 37 communicating with the working-pressure chamber 8 are provided. The control valve 32 is adapted to connect or disconnect the constant-pressure passage 36, the atmospheric passage 37, or atmospheric environment according to relative displacement between the valve body 11 and the plunger 31. Normally, the control valve 32 connects the constant-pressure passage 36 (that is, the constant-pressure chamber 7) with the atmospheric passage 37 (that is, the working-pressure chamber 8). When the plunger 31 is advanced relative to the valve body 11, the control valve 32 will disconnect the constant-pressure passage 36 from the atmospheric passage 37. Furthermore, when the plunger 31 is further advanced, the atmospheric passage 37 is adapted to open to atmosphere through the dust seal 34.

A stop key 38 is inserted into the atmospheric passage 37 of the valve body 11. By making the stop key 38 engaged with a step portion of the cylindrical portion 12 of the rear shell 3, backward movement of the valve body 11 is limited. Further, by making the stop key 38 engaged with an exterior groove of the plunger 31, quantity of relative displacement between the valve body 11 and the plunger 31 is limited. Between the front shell 2 and the valve body 11, a return spring 39 making the valve body 11 urged to move backward is provided. Further, a return spring 40 making the input rod 33 urged to move backward is provided in the valve body 11.

Hereinafter, functions of the embodiments of the present invention discussed above will be explained. In a non-braking condition, the plunger 31 is placed backward, so that the constant-pressure passage 36 (that is, the constant-pressure chamber 7) and the atmospheric passage 37 (that is, the working-pressure chamber 8) are made connected with each other by means of the control valve 32. Accordingly, pressure within the constant-pressure chamber and the working-pressure chamber 8 becomes identical, resulting in no thrust force given to the power piston 6.

By making the plunger 31 advanced by means of the input rod 22 through operation of the brake pedal B, the control valve 32 will disconnect the atmospheric passage 37 from the constant-pressure passage 36. When the plunger 31 is further advanced, the atmospheric passage 37 is opened toward atmosphere, whereby air will be introduced into the working-pressure chamber 8. Accordingly, pressure difference will be generated between the constant-pressure chamber 7 and the working-pressure chamber 8 so as to give thrust force to the power piston 6 thereby advancing the valve body 11. The output rod 28 is then advanced through the reaction member 27 so as to generate thrust force by pressing the piston of the master cylinder M. Since the atmospheric passage 37 will be disconnected from atmosphere by means of the control valve 32 when the valve body 11 is advanced, the pressure difference between the constant-pressure chamber 7 and the voltage-transformer 8, that is, thrust force of the power piston 6, will be remained thereby keeping braking conditions.

Here, counterforce based on power applied to the output rod 28 acting from the valve body 11 to the reaction member 27 will be partially fed back to the brake pedal B through the reaction rod 30, the plunger 31 and the input rod 33. Accordingly, the braking force with a predetermined boost ratio can be generated based on control force of the brake pedal B. Further, by changing pressured surface ratios between the valve body 11 and the reaction rod 30 relative to the reaction member 27 by the counterforce adjusting member 29, the boost ratio can be adjusted.

In a non-braking condition, it is possible to provide clearance between the reaction member 27 and the reaction rod 30. With this structure, at an initial stage of braking, this clearance will work on the plunger 31 to move it advance without any counterforce from the reaction member 27 thereby achieving a quick start of braking force (so-called a Jump-in effect).

When the inputted force applied to the input rod 33 is released by making the brake pedal B returned, the plunger 31 moves backward so as to connect with the constant-pressure passage 36 in a condition where the atmospheric passage 37 is disconnected from atmosphere by means of the control valve 32. Accordingly, the pressure difference between the constant-pressure chamber 7 and the working-pressure chamber 8 is removed whereby thrust force of the power piston 6 is cleared so as to stop the braking force while removing the thrust force of the power piston 6.

Load affecting the housing 4 in an axial direction due to pressure generated by both the constant-pressure chamber 7 and the working-pressure chamber 8 can be received by the front flange 17 and the rear flange 18 of the tie rod 14 that penetrates the housing 4, contributing to suppressing deformation of the housing 4.

Pressure fluctuation of the working-pressure chamber 8 during braking will generate pressure in a direction where the front shell 2 pushes the rear shell 3, whereby the rear shell 3 tends to be deformed. However, as discussed hereinabove, in the present invention the thickness Tf of the front shell 2 is made thinner than the one of the conventional front shell while the thickness Tr of the rear shell 3 is made thicker than the one of the conventional rear shell. Accordingly, since the strength of the rear shell 3 becomes increased, the deformation of the rear shell 3 can be avoided. This means that while ensuring deformation strength of a housing to be identical with the conventional housing where the thickness Tf of the front shell and the thickness Tr of the rear shell are identical, it is possible to make the front shell 2 to be further thinner. That is, since the front shell 2 has a surface area larger than the rear shell 3, weight-saving can be effectively realized. Further, because the tie rod 14 and the rear bolt 23 are fixed through caulking on the side of the rear shell 3 having a thicker thickness, it is possible to obtain sufficient mounting strength.

Conventionally, the thickness of the front shell and the rear shell has been made to be identical thereby satisfying rigidity of the housing of a pneumatic booster as a whole. In the present invention, the thickness of the front shell 2 is made thinner than the one of the conventional front shell thereby contributing to easy deformation. Accordingly, in case that a vehicle comes into collision, and that excessive external force is directly applied to the front shell 2 from on-vehicle equipments such as an engine or the other accessories, the front shell 2 is allowed to well absorb the external force thereby inhibiting the pneumatic booster 1 from shifting to the side of a driving area.

Still further, in the vehicle collision, excessive external force that is offset from the master cylinder M in its axial direction (i.e. Offset load) may apply to the housing 4 through the master cylinder M. In this case, the Offset load transmitted through the master cylinder M may act in a manner that the master cylinder M shift offset in a radial direction of the output rod 28. Accordingly, the front shell 2 can be easily deformed from a portion near the mounting portion of the master cylinder M, whereby it is possible to inhibit the output rod 28 from shifting to the side of a driving area, that is, inhibiting the brake pedal B from shifting to the driving area.

Figure 6:
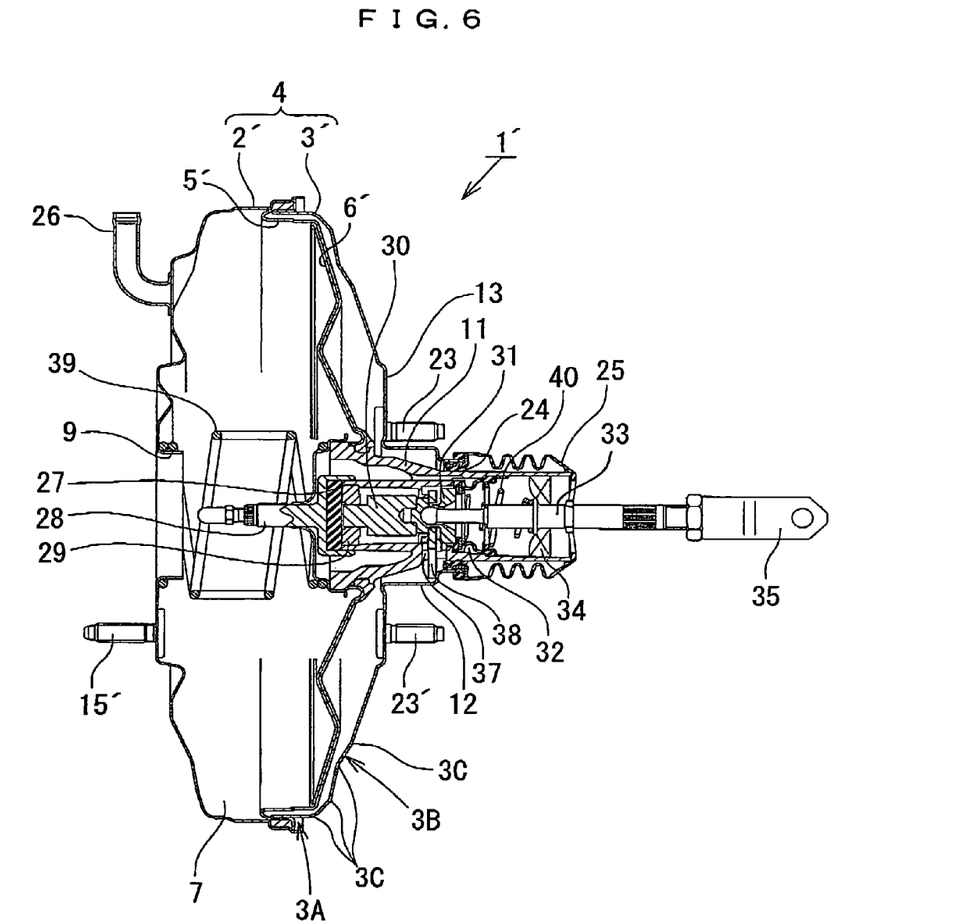
FIG. 6 illustrates a longitudinal section of a pneumatic booster according to another embodiment of the present invention.

In the above embodiment, the housing 4 of the pneumatic booster 1 is provided with the tie rod 14 that penetrates the front shell 2 and the rear shell 3 so as to improve rigidity of the housing 4. Further, the thickness Tf of the front shell 2 is made to be thinner than the one of the conventional front shell while the thickness Tr of the rear shell 3 is made to be thicker than the one of the conventional rear shell. However, as shown in FIG. 6, it is possible to design a pneumatic booster 1' that is not provided with the tie rod 14. As the same with the above, the thickness Tf of a front shell 2' is made to be thinner than the one of the conventional front shell while the thickness Tr of a rear shell 3' is made to be thicker than the one of the conventional rear shell. Here, the structure of the pneumatic booster 1' shown in FIG. 6 is approximately identical with one of the pneumatic booster 1 whereby the same reference numerals are applied to members corresponding to the pneumatic booster 1.

Also, in this case, the pneumatic booster 1' can enjoy the same effects with the pneumatic booster 1 discussed hereinabove. Further, since the rear bolt 23 is fixed through caulking on a side of the rear shell 3' having a thickness that is thicker than the conventional rear shell, it is possible to obtain mounting strength that is stronger than the conventional one.

What is claimed is:

1. A pneumatic booster, comprising:
   a front shell being mostly configured to have a single piece of material;
   a rear shell being mostly configured to have a single piece of material;
   a housing formed of the single piece material of the front shell and the single piece material of the rear shell integrally united to each other at respective openings, and
   a power piston arranged in the housing so as to divide an interior of the housing into a constant-pressure chamber on the single piece material of the front shell side and a working-pressure chamber on the single piece material of the rear shell side,
   wherein thrust force of the power piston generated by pressure difference between the constant-pressure chamber and the working-pressure chamber is added to inputted force transmitted from a brake pedal to an input rod so as to obtain combined force, the combined force being outputted with a given boost ratio to an output rod, and
   wherein a thickness of the single piece material of the front shell is made to be thinner than a thickness of the single piece material of the rear shell, and
   a tie rod is arranged by penetration of the power piston so as to unite the single piece material of the front shell with the single piece material of the rear shell, the tie rod being provided with a mounting screw portion to a vehicle body on one end side thereof.

2. The pneumatic booster according to claim 1, wherein the difference between the thickness of the single piece material of the front shell and the thickness of the single piece material of the rear shell is defined within 0.1 mm to 0.3 mm.

3. The pneumatic booster according to claim 1, wherein a fixed screw portion is provided on the other end side of the tie rod for fixation of a master cylinder.

4. The pneumatic booster according to claim 1, wherein the single piece material of the rear shell comprising:
   a cylindrical portion where a valve body is inserted, the valve body movable within the housing;
   a vehicle attached portion provided on an outer periphery of the cylindrical portion, the vehicle attached portion being attached to a vehicle body when mounting on the vehicle body;
   a major-diameter cylindrical portion being united to the single piece material of the front shell; and
   an inclined portion, formed approximately into circular cone, connecting the major-diameter cylindrical portion with the vehicle attached portion,
   wherein the inclined portion is provided with a plurality of bent portions in a radial direction of the rear shell, each of the plurality of bent portions extending circumferentially as a part of the rear surface of the rear shell.

5. The pneumatic booster according to claim 1, wherein the single piece material of the front shell and the single piece material of the rear shell are united to each other by caulking a periphery of the single piece material of the front shell.

6. The pneumatic booster according to claim 1, wherein the constant-pressure chamber is configured to have a connection to a negative pressure source; an internal pressure of the working-pressure chamber is configured to be changed due to either a connection to the constant-pressure chamber or access to atmosphere, and the thickness of the single piece material of the rear shell is set to be the one which enables to suppress deformation by pressure fluctuation of the working-pressure chamber at braking.

7. A pneumatic booster, comprising:
   a front shell on which a master cylinder is mounted, the front shell being mostly configured to have a single piece of material;
   a rear shell being mostly configured to have a single piece of material and being arranged on a side of a vehicle body;

a housing formed of the single piece material of the front shell and the single piece material of the rear shell integrally united to each other at respective openings;

a power piston arranged in the housing so as to divide an interior of the housing into a constant-pressure chamber on the single piece material of the front shell side and a working-pressure chamber on the single piece material of the rear shell side; and a tie rod that penetrates the single piece material of the front shell, the single piece material of the rear shell and the power piston, the tie rod being provided with a mounting screw portion to the side of a vehicle body on one side of the tie bar, wherein thrust force of the power piston generated by pressure difference between the constant-pressure chamber and the working-pressure chamber is added to inputted force transmitted from a brake pedal to an input rod so as to obtain combined force, the combined force being outputted with a given boost ratio to an output rod, and wherein a thickness of the single piece material of the front shell is made to be thinner than a thickness of the single piece material of the rear shell.

8. The pneumatic booster according to claim 7, wherein the difference between the thickness of the single piece material of the front shell and the thickness of the single piece material of the rear shell is defined within 0.1 mm to 0.3 mm.

9. The pneumatic booster according to claim 7, wherein a fixed screw portion is provided on the other end side of the tie rod for fixation of the master cylinder.

10. The pneumatic booster according to claim 7, wherein the single piece material of the rear shell comprising:

a cylindrical portion where a valve body is inserted, the valve body movable within the housing;

a vehicle attached portion provided on an outer periphery of the cylindrical portion, the vehicle attached portion being attached to the vehicle body when mounting on the vehicle body;

a major-diameter cylindrical portion being united to the single piece material of the front shell; and an inclined portion, formed approximately into circular cone, connecting the major-diameter cylindrical portion with the vehicle attached portion, wherein the inclined portion is provided with a plurality of bent portions in a radial direction of the rear shell, each of the plurality of bent portions extending circumferentially as a part of the rear surface of the rear shell.

11. The pneumatic booster according to claim 7, wherein the single piece material of the front shell and the single piece material of the rear shell are united to each other by caulking a periphery of the single piece material of the front shell.

12. The pneumatic booster according to claim 7, wherein the constant-pressure chamber is configured to have a connection to a negative pressure source; an internal pressure of the working-pressure chamber is configured to be changed due to either a connection to the constant-pressure chamber or access to atmosphere, and the thickness of the single piece material of the rear shell is set to be the one which enables to suppress deformation by pressure fluctuation of the working-pressure chamber at braking.

13. A pneumatic booster, comprising:

a front shell on which a master cylinder is mounted, being mostly configured to have a single piece of material;

a rear shell being mostly configured to have a single piece of material, and being arranged on a side of a vehicle body;

a housing integrally formed of the single piece material of the front shell and the single piece material of the rear shell;

a power piston that is arranged in the housing so as to divide an interior of the housing into a constant-pressure chamber on the single piece material of the front shell side and a working-pressure chamber on the single piece material of the rear shell side;

a tie rod that penetrates the power piston so as to unite the single piece material of the front shell with the single piece material of the rear shell, the tie rod being provided with a mounting screw portion to the side of a vehicle body on one side of the tie bar and also being provided with a fixed screw portion on the other end side of tie rod for fixation of the master cylinder;

a valve body that is movably inserted into the housing so as to connect with the power piston;

an input rod that is inserted into the valve body, and that is connected to a brake pedal through a clevis;

a plunger that is connected with the input rod, the plunger being movable within the valve body;

an output rod that is provided with the valve body so as to operate the master cylinder;

a reaction member that is provided between the output rod and the valve body or the plunger, the reaction member partially transmitting reaction force generated from the output rod to the plunger; and a control valve enabling to convert a connection between the working-pressure chamber and atmosphere as well as a connection between the constant-pressure chamber and the working-pressure chamber;

wherein a thickness of the single piece material of the front shell is made to be thinner than a thickness of the single piece material of the rear shell, and one end side of the tie rod is fixed to the rear shell through caulking.

14. The pneumatic booster according to claim 13, wherein the difference between the thickness of the single piece material of the front shell and the thickness of the single piece material of the rear shell is defined within 0.1 mm to 0.3 mm.

15. The pneumatic booster according to claim 13, wherein the single piece material of the rear shell comprising:

a cylindrical portion where a valve body is inserted, the valve body movable within the housing;

a vehicle attached portion provided on an outer periphery of the cylindrical portion, the vehicle attached portion being attached to the vehicle body when mounting on the vehicle body;

a major-diameter cylindrical portion being united to the single piece material of the front shell; and an inclined portion, formed approximately into circular cone, connecting the major-diameter cylindrical portion with the vehicle attached portion, wherein the inclined portion is provided with a plurality of bent portions in a radial direction of the rear shell, each of the plurality of bent portions extending circumferentially as a part of the rear surface of the rear shell.

16. The pneumatic booster according to claim 13, wherein the single piece material of the front shell and the single piece material of the rear shell are united to each other by caulking a periphery of the single piece material of the front shell.

17. The pneumatic booster according to claim 13, wherein the constant-pressure chamber is configured to have a connection to a negative pressure source; an internal pressure of the working-pressure chamber is configured to be changed due to either a connection to the constant-pressure chamber or access to atmosphere, and the thickness of the single piece material of the rear shell is set to be the one which enables to suppress deformation by pressure fluctuation of the working-pressure chamber at braking.

* * * * *